US011830352B1

(12) United States Patent
Agrawal et al.

(10) Patent No.: US 11,830,352 B1
(45) Date of Patent: Nov. 28, 2023

(54) HAPTIC VIBRATION EXPOSURE CONTROL BASED ON DIRECTIONAL POSITION OF POWER RECOVERY MODULE

(71) Applicant: INTERNATIONAL BUSINESS MACHINES CORPORATION, Armonk, NY (US)

(72) Inventors: Tushar Agrawal, West Fargo, ND (US); Clement Decrop, Arlington, VA (US); Christian Compton, Austin, TX (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/818,781

(22) Filed: Aug. 10, 2022

(51) Int. Cl.
*G08B 6/00* (2006.01)
(52) U.S. Cl.
CPC ..................... *G08B 6/00* (2013.01)
(58) Field of Classification Search
CPC ........................................................ G08B 6/00
USPC ..................................................... 340/407.1
See application file for complete search history.

(56) References Cited

U.S. PATENT DOCUMENTS

| 8,860,234 | B2 | 10/2014 | Hoffman | |
| 11,700,773 | B2 * | 7/2023 | Farhangdoust | B60L 53/56 |
| 2009/0230924 | A1 * | 9/2009 | Wright | H02N 2/181 |
| | | | | 320/148 |
| 2013/0162579 | A1 | 6/2013 | Modarres | |
| 2017/0194881 | A1 | 7/2017 | Apdalhaliem | |
| 2022/0131424 | A1 * | 4/2022 | Charthad | H04B 13/005 |
| 2022/0144376 | A1 * | 5/2022 | de Cérou | B62J 6/16 |
| 2022/0265157 | A1 * | 8/2022 | Charthad | A61B 8/488 |

FOREIGN PATENT DOCUMENTS

| CN | 1449202 A | 10/2003 |
| CN | 108697458 A | 10/2018 |
| JP | 2021072707 A | 5/2021 |
| TW | 201528304 A | 7/2015 |

(Continued)

OTHER PUBLICATIONS

IBM Design, "Approach UX holistically," IBM.com [online], [accessed on Jul. 28, 2022], 2 pages, Retrieved from the Internet: <URL: http://ibm-design-language.mybluemix.net/design/language/experience/vrar/user-comfort/holistic-experience/>.

(Continued)

*Primary Examiner* — Jack K Wang
(74) *Attorney, Agent, or Firm* — Robert D. Bean (57) ABSTRACT

According to one embodiment, a method, computer system, and computer program product for recovering power from haptic feedback is provided. The present invention may include identifying one or more haptic devices and one or more power recovery devices associated with a user; dynamically monitoring a position and distance of the one or more haptic devices and the one or more power recovery devices; predicting how much power can be recovered by the one or more power recovery devices from haptic feedback generated by the one or more haptic devices based on the position and distance; and change a direction of haptic feedback based on the prediction, position, and distance.

20 Claims, 3 Drawing Sheets

(56) References Cited

FOREIGN PATENT DOCUMENTS

WO 2017037793 A1 3/2017

OTHER PUBLICATIONS

Market Watch, "Global Haptic Technology Product for Mobile Device Market—Research Report Provides an In-Depth Insight of Trends (2022-2028)," Marketwatch.com [press release], Jul. 26, 2022 [accessed on Jul. 29, 2022], 10 pages, Retrieved from the Internet: <URL: https://www.marketwatch.com/press-release/global-haptic-technology-product-for-mobile-device-market-research-report-provides-an-in-depth-insight-of-trends-2022---2028-2022-07-26>.

Markets and Markets, "Haptic Technology Market by Component (Hardware, Software), Feedback Type (Tactile, Force), Application (Consumer Devices, Automotive & Transportation, Healthcare, Commercial & Industrial, Others) and Region (2021-2026)," marketsandmarkets.com [online], [accessed on Jul. 12, 2022], 12 pages, Retrieved from the Internet: <URL: https://www.marketsandmarkets.com/Market-Reports/haptic-technology-market-443.html>.

Screen captures from YouTube video clip entitled "Rendering Volumetric Haptic Shapes in Mid-Air using Ultrasound," 4 pages, uploaded on Nov. 21, 2014 by BristollG lab, Retrieved from the Internet: <URL: https://www.youtube.com/watch?v=kaoO5cY1aHk>.

\* cited by examiner

HAPTIC VIBRATION EXPOSURE CONTROL BASED ON DIRECTIONAL POSITION OF POWER RECOVERY MODULE

BACKGROUND

The present invention relates, generally, to the field of computing, and more particularly to haptic technology.

Haptic technology refers to any technology that can create an experience of touch even in the absence of a tangible object or substance by applying forces, vibrations, or motions to the user. These technologies can be used to facilitate human interaction with computer-generated objects in a computer simulation, by allowing a human to "touch" entirely virtual constructs or environmental elements, and to provide sensory feedback in the form of tactile sensations to human users as a sensory cue even in the absence of physical objects. This may in turn be used to improve the creation and manipulation of virtual objects, improve the immersion of virtual reality simulations, enhance control of machines and devices, provide information to a user through tactile stimulus, et cetera. Haptic technologies are in widespread use today, as part of devices ranging from smart watches to game controllers to cellphones to haptic gloves.

SUMMARY

According to one embodiment, a method, computer system, and computer program product for recovering power from haptic feedback is provided. The present invention may include identifying one or more haptic devices and one or more power recovery devices associated with a user; dynamically monitoring a position and distance of the one or more haptic devices and the one or more power recovery devices; predicting how much power can be recovered by the one or more power recovery devices from haptic feedback generated by the one or more haptic devices based on the position and distance; and change a direction of haptic feedback based on the prediction, position, and distance.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to haptic technology. The following described exemplary embodiments provide a system, method, and program product to, among other things, alter the type and direction of haptic feedback generated by haptic feedback devices to improve power generation from power recovery devices.

As previously described, haptic technology refers to any technology that can create an experience of touch even in the absence of a tangible object or substance by applying forces, vibrations, or motions to the user. There are several common means by which haptic feedback may be created. Many electronics offering haptic feedback use vibrations, and of those many use a type of eccentric rotating mass (ERM), a linear resonant actuator (LRA), or a piezoelectric actuator to create these vibrations. Other electronics produce haptic feedback through air vortex rings, which are toroidal air pockets made up of concentrated gusts of air. Still others may use ultrasound; focused ultrasound beams can be used to create a localized sense of pressure on a finger without touching any physical object.

With the increasing proliferation of haptic-enabled devices in the form of mobile devices, smart appliances, touchscreens, et cetera, a user may interact with haptic devices on a regular basis and may habitually carry haptic devices on her person. The tactile feedback produced by these devices may be harvested to recover a fraction of the electrical energy the devices expended through the use of a power recovery device.

Power recovery devices may be devices designed to capture input power as it escapes a system, preventing the energy from being released back to nature and instead keeping it within the system to be used for other forms of work. Some power recovery devices utilize the piezoelectric effect, which is a phenomenon where an electric charge accumulates in certain solid materials, called piezoelectric materials, in response to applied mechanical stress. When exposed to tactile feedback produced by haptic devices, a piezoelectric material experiences mechanical stress and generates an electric charge, which may be used to charge electrical devices including the same electrical device producing the haptic feedback.

However, the magnitude of power recovery derived from haptic feedback using piezoelectric materials is dependent on how the piezoelectric material is exposed to the haptic environment. The stronger the haptic feedback, the more charge is generated, but the position and direction of the piezoelectric material relative to the source of the haptic feedback also affects the magnitude of the generated charge. As such, to improve the charge generated by the power recovery module through exposure to a source of haptic feedback, it is necessary to manage the positioning and distance of the source of the haptic feedback in relation to the power recovery model. In the case where multiple devices comprising power recovery modules and haptic feedback sources are worn and/or carried by a user, this management must be continuous and dynamic as the devices may be constantly in motion relative to each other.

As such, it may be advantageous to, among other things, implement a system that adjusts the direction of haptic interaction between one or more devices comprising one or more power recovery modules and one or more sources of haptic feedback based on the number and type of devices available, the position and distance of the devices relative to each other, and predictions regarding the amount of power that can be recovered by the devices. Therefore, the present embodiment has the capacity to improve the technical field of haptic technology by dynamically adjusting the type and direction of haptic feedback to improve exposure of the power recovery modules to the haptic feedback, thereby improving power recovery. In some embodiments, the invention may recommend that a user move the devices to specific positions to improve power recovery based on predicting what relative device positions would yield the most power.

According to at least one embodiment, the invention may be a method of identifying one or more haptic devices and one or more power recovery devices carried by or near a user, dynamically monitoring a distance and position of the haptic devices and power recovery devices, detecting when the one or more haptic devices are generating haptic feedback, predicting how much power can be recovered by the power recovery devices, change the direction of the haptic feedback based on the predicted power recovery, and recommending that a user move the haptic devices and power recovery devices based on the predicted power recovery and the distance and the position.

In some embodiments of the invention, haptic devices may be devices capable of generating haptic feedback. Haptic feedback may comprise forces, vibrations or motions that are used to create a sensation of touch for a user. Haptic feedback may include mechanical vibrations, ultrasound, gusts of air, acoustic waves, et cetera. Haptic devices may include devices that create vibrations such as vibrational motors, piezo haptic sensors, et cetera, devices that create gusts of air, such as jet air nozzles, air vortex ring generators, fan blowers, et cetera, and/or devices that produce sound waves such as cell phone speakers, ultrasonic frequency generators, bass drivers, et cetera. Any given device, for instance a mobile device such as a cell phone or tablet, may comprise a number and combination of multiple different haptic devices. For example, a cell phone may comprise three haptic devices: two speakers and a vibrational motor. In some embodiments of the invention, the haptic devices may be internet of things (IoT) enabled, such that the haptic devices comprise or are integrated into devices comprising sensors, processing ability, software, and/or other technologies that enables them to connect and exchange data with other devices and systems over the Internet or other communications networks.

In some embodiments of the invention, one or more haptic devices are capable of projecting haptic feedback in a particular direction, and/or may be able to change the direction in which they are directing haptic feedback in response to commands from the system. For example, where the haptic device is a jet air nozzle, the nozzle may be designed such that it may swivel, and thereby direct air in any of a number of directions. In another example, the haptic device may be a speaker mounted on a microfluidics mechanism that can create a bubble underneath the speaker that is off-center from the speaker, such that once inflated, the speaker is disposed on the side of the bubble that faces the desired direction; in this manner, the facing of the speaker and the direction in which it broadcasts haptic feedback may be controlled.

In some embodiments of the invention, power recovery devices may be devices that comprise piezoelectric materials such as crystals, certain ceramics, various proteins, et cetera that produce electrical power when exposed to mechanical strain such as that generated by haptic feedback. The power recovery devices may be integrated into mobile devices such as cell phones and tablets, and/or may be mounted on or integrated into wearable devices such as rings, smart watches, clothing, et cetera. In at least one embodiment, the power recovery device may comprise an array of piezoelectric crystals around the circumference of a circular or elliptical device such as a ring or watch. In some embodiments of the invention, the power recovery devices may be internet of things (IoT) enabled, such that the power recovery devices comprise or are integrated into devices comprising sensors, processing ability, software, and/or other technologies that enables them to connect and exchange data with other devices and systems over the Internet or other communications networks.

In some embodiments of the invention, the haptic devices and power recovery devices may be integrated into mobile devices such as cell phones, tablets, and wearable devices such as smartwatches, clothing, rings, et cetera to form a multi-device ecosystem that is collectively worn, carried, or kept geographically proximate to the person of the user. In some embodiments of the invention, the multi-device ecosystem may comprise devices that are all part of a network and/or all capable of communicating with each other. The multi-device ecosystem may comprise devices that are owned by the user, and/or the user may provide to the system a list of devices owned by and/or associated with the user that the user designates as comprising the multi-device ecosystem. The system may prompt the user to provide the list, for example through a graphical, audible, or textual prompt on a device owned by the user. In some embodiments of the invention, the user may access the list, and/or may edit the list to add or subtract devices from the multi-device ecosystem, for instance as the user retires old devices and/or purchases new devices.

In some embodiments of the invention, the system may identify one or more haptic devices and one or more power recovery devices. The system may identify the devices, for example, by communicating with nearby devices that are IoT-enabled over a network to obtain the device's information such as device name, device type, device serial number, et cetera. The system may use the device information to search a database comprising information about a range of different devices to retrieve additional data on the device, such as whether the device is or comprises a haptic device or a power recovery device, what type of haptic feedback a haptic device produces, how much power a power recovery device produces in different contexts, et cetera. In some embodiments, for example where the user has provided a list of devices comprising the multi-device ecosystem, the system may request device information only from those devices that are initially identified as part of the multi-device ecosystem.

In some embodiments of the invention, the system may dynamically monitor the distance and position of the haptic devices and power recovery devices. The system may monitor the location of one or more mobile devices based on sensors integrated with the devices such as accelerometers, and/or by triangulation or GPS navigation. The system may also or alternatively use location sensors installed within an environment to track the location of the mobile devices, for instance using microlocation technology such as RFID tags, Bluetooth beacons, et cetera. The system may assess the location of the devices at regular intervals of time; these intervals may be low enough, such as between a second to a minute, that the monitoring takes place in real time or near-real-time. In some embodiments of the invention, for example where the system knows how much power a power recovery device generates from haptic feedback of certain intensities and types and knows that a haptic device is generating haptic feedback of a particular type, the system may infer a distance between the power recovery device and the haptic device that is generating haptic feedback based on the amount of power being generated by the power recovery device. Where there are three or more power recovery devices, the system may triangulate the location of the haptic device generating haptic feedback based on the power generation of the power recovery devices. In some embodiments of the invention, if the system identifies the power recovery modules as being outside of a threshold distance from the haptic device generating haptic feedback, then the power recovery functionality may be disabled.

In some embodiments, the system may dynamically assess whether the individual devices of the multi-device ecosystem are on the person of the user. If a user regularly carries more than one mobile device comprising haptic devices and/or power recovery devices, such as a second cell phone, a wearable activity tracker, a smart headset, and/or a smart watch, the system may infer whether a device is on the person of the user based on the movement of the first mobile device to the second. For instance, if a user usually carries a mobile phone and a smart watch, the position and movement of the two is usually the same or similar relative to each other. If one of the mobile devices stops moving relative to the other, or the distance between the two devices exceeds a threshold, than the user may have put down and left unattended the stationary mobile device. The system may likewise infer when a device is not on the person of the user from sensor readings; for instance, if accelerometer readings or movements of a device identified via location tracking cease for a threshold amount of time, such as 10 seconds, the system may infer that the mobile device is no longer on the person of a user. If the system identifies that a device is not on the person of the user, and/or that the device is not within a threshold distance of the user, the system may remove the device from the multi-device ecosystem. Likewise, if a device comes within the threshold distance of devices within the multi-device ecosystem and/or begins to move relative to other devices of the multi-device ecosystem, the system may automatically add the device to the multi-device ecosystem. In some embodiments of the invention, the system may prompt the user for confirmation before adding or removing a device from the multi-device ecosystem.

In some embodiments of the invention, the system may predict how much power can be recovered by the power recovery devices; the system may know the number and types of power recovery devices within the multi-device ecosystem and the amount of power they respectively generate in response to different types and/or intensities of haptic feedback, such as by retrieving the data from a database of device information on the power recovery devices and/or through historical learning with respect to how much power similar power recovery devices generated when exposed to types of feedback similar to that which the haptic devices of the multi-device ecosystem are capable of producing in the past. The system further knows the distance of the power recovery devices from the haptic devices; the system may thereby predict how much power can be recovered individually and/or collectively by the power recovery devices from haptic feedback generated by the haptic devices at the currently identified distances between the respective devices. In some embodiments of the invention, the system may further infer what types of haptic feedback produce the most power from a given power recovery device or type of power recovery device at what distances and may further predict power yield of different types of haptic feedback at a range of distances from a given power recovery device.

In some embodiments of the invention, the prediction may be carried out using a machine learning model. The term 'machine learning' refers to a computer algorithm used to extract useful information from training datasets by building probabilistic models, referred to as machine learning models, in an automated way. The machine learning may be performed using one or more learning algorithms such as linear regression, k-nearest neighbor techniques, support vector machines or classification/regression trees etc. A 'model' may for example be an equation or set of rules that makes it possible to predict an unmeasured value or set of values, e.g., an event schema defining a logical structure of event data, from other, known values, e.g., the event data. The machine learning model may be trained on historical data, such as how much power recovery devices generated when exposed to different types of feedback generated by haptic devices in the past, and user feedback regarding the accuracy of the machine learning model's generated predictions.

In some embodiments of the invention, for example where one or more haptic devices are capable of projecting haptic feedback in a particular direction and can change the direction in which they project haptic feedback in response to commands to the system, the system may change the direction of the haptic feedback based on the prediction and/or the position of the devices. For example, the system may, based on the position of the relative devices, operate a haptic device to change the direction of the haptic feedback projected from the haptic device such that the haptic feedback is aimed towards one or more of the power recovery modules, and/or by aiming haptic feedback from a given haptic device at the closest power recovery module to that haptic device. The system may change the direction of the haptic feedback based on the prediction by, for example, for each haptic device, determining based on the type of haptic feedback produced by the haptic device and the respective distances between the haptic device and two or more power recovery devices, which power recovery device would produce the most power if the haptic feedback were to be aimed at it. In some embodiments of the invention, for example where a mobile device is equipped with a plurality of haptic devices that produce two or more different types of haptic feedback, the system may choose one type of haptic feedback to produce based on predicting which type of haptic feedback would produce the most power in the aggregate based on the position, number, and/or type of power recovery modules in the multi-device ecosystem. In some embodiments of the invention, for example where the distance between a haptic device and any power recovery devices exceeds a threshold distance and/or where the system predicts that no power recovery device would generate power exceeding a minimum threshold from haptic feedback generated by the haptic device, the system may operate the mobile device comprising the haptic device to produce non-haptic feedback, such as a blinking light or a displaying a graphical element.

In some embodiments of the invention, the system may determine when a mobile device comprising one or more haptic devices will generate haptic feedback by communicating with the mobile device to determine which events trigger haptic feedback on the mobile device, such as receipt of new messages or notifications, and identifying when those events have occurred with respect to the mobile device. In some embodiments of the invention, for example where the mobile device comprises haptic devices capable of producing multiple types of haptic feedback, the system may choose the type of haptic feedback to produce based on the prediction in response to detecting that an event has occurred. In some embodiments of the invention, the system may briefly delay the triggering of haptic feedback from a mobile device upon detection of an event, for example to give time for the system to reorient aimable haptic devices.

In some embodiments of the invention, the system may recommend that a user move the haptic devices and power recovery devices based on the prediction, distance, and/or position. The system may identify what relative positions of the haptic devices and power recovery devices would yield the greatest power recovery from the prediction, and may instruct the user, for example through a prompt on the user's mobile device comprising textual or graphical instructions, to move the devices into the predicted positions. For example, if the user is carrying a cell phone equipped with a power recovery device and is reading a book on a tablet equipped with a haptic device that vibrates when the user turns the page, the system may recommend that the user place the cell phone next to the tablet so that the power recovery device of the cell phone may recover energy from the vibrations triggered by the haptic device in the tablet.

In an exemplary implementation of the system, user Josh is working on his tablet equipped with haptic devices and wearing a smartwatch equipped with a power recovery device. Josh receives a push notification on the tablet which triggers haptic vibrations. The system recognizes that the smartwatch is on the right side of the tablet relative to Josh, is capable of power recovery, and is within range; the system consequently uses the nearest haptic device to generate the haptic vibrations while providing the power recovery to Josh's smartwatch.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The following described exemplary embodiments provide a system, method, and program product to alter the type and direction of haptic feedback generated by haptic feedback devices to improve power generation from power recovery devices.

Figure 1:
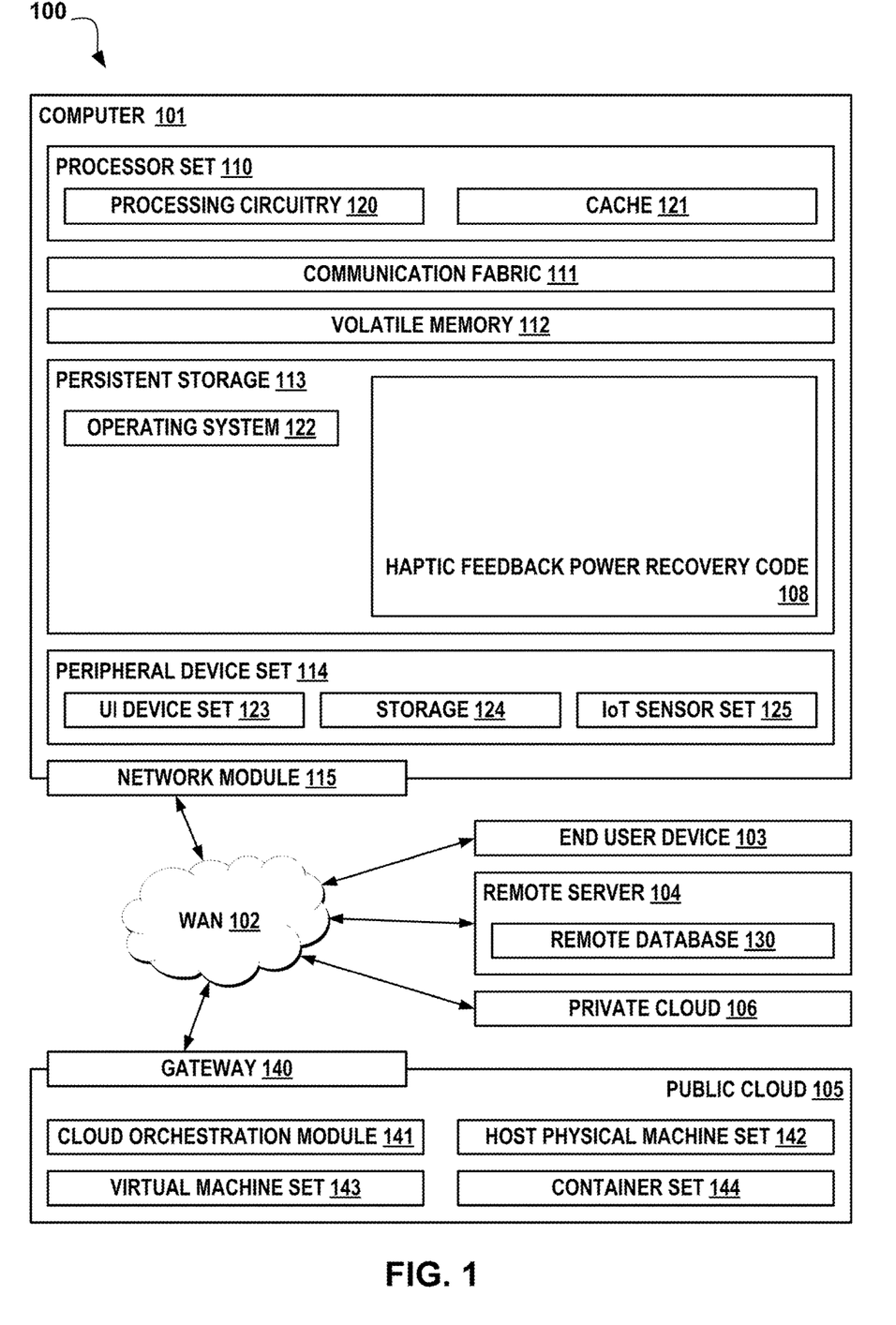
FIG. 1 illustrates an exemplary networked computer environment according to at least one embodiment.

Referring now to FIG. 1, computing environment 100 contains an example of an environment for the execution of at least some of the computer code involved in performing the inventive methods, such as haptic feedback power recovery code 108. In addition to haptic feedback power recovery code 108, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and haptic feedback power recovery code 108, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in haptic feedback power recovery code 108 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open-source Portable Operating System Interface type operating systems that employ a kernel. The code included in haptic feedback power recovery code 108 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector. Peripheral device set 114 may further comprise power recovery devices.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the haptic feedback power recovery code 108 may comprise a program enabled to alter the type and direction of haptic feedback generated by haptic feedback devices to improve power generation from power recovery devices. The haptic feedback power recovery code 108 may, when executed, cause the computing environment 100 to carry out a haptic feedback power recovery process 200. The haptic feedback power recovery process 200 is explained in further detail below with respect to FIG. 2.

Figure 2:
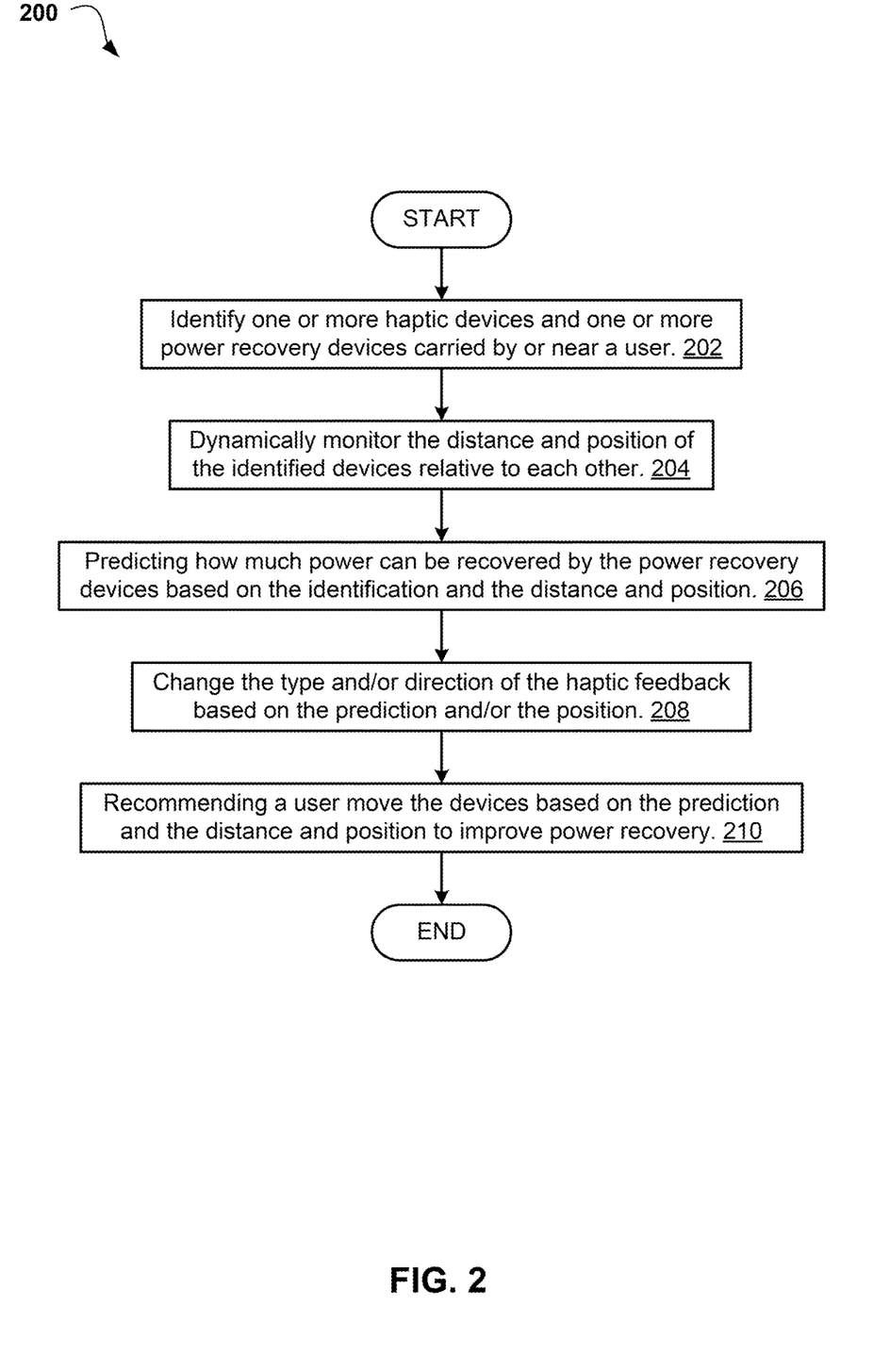
FIG. 2 is an operational flowchart illustrating a haptic feedback power recovery process according to at least one embodiment.

Referring now to FIG. 2, an operational flowchart illustrating a haptic feedback power recovery process 200 is depicted according to at least one embodiment. At 202, the haptic feedback power recovery code 108 identifies one or more haptic devices and one or more power recovery devices on the person of, and/or carried by and/or near a user. The haptic feedback power recovery code 108 may identify the devices, for example, by communicating with nearby devices that are IoT-enabled over a network to obtain the device's information such as device name, device type, device serial number, et cetera. The haptic feedback power recovery code 108 may use the device information to search a database comprising information about a range of different devices to retrieve additional data on the device, such as whether the device is or comprises a haptic device or a power recovery device, what type of haptic feedback a haptic device produces, how much power a power recovery device produces in different contexts, et cetera. In some embodiments of the invention, the haptic feedback power recovery code 108 may identify the need of interaction with the various devices. In some embodiments, for example where the user has provided a list of devices comprising the multi-device ecosystem, the haptic feedback power recovery code 108 may request device information only from those devices that are initially identified as part of the multi-device ecosystem.

At 204, the haptic feedback power recovery code 108 dynamically monitors the distance and position of the identified devices relative to each other. The haptic feedback power recovery code 108 may monitor the location of one or more mobile devices based on sensors integrated with the devices such as accelerometers, and/or by triangulation or GPS navigation. The haptic feedback power recovery code 108 may also or alternatively use location sensors installed within an environment to track the location of the mobile devices, for instance using microlocation technology such as RFID tags, Bluetooth beacons, et cetera. The haptic feedback power recovery code 108 may assess the location of the devices at regular intervals of time; these intervals may be low enough, such as between a second to a minute, that the monitoring takes place in real time or near-real-time. In some embodiments of the invention, for example where the haptic feedback power recovery code 108 knows how much power a power recovery device generates from haptic feedback of certain intensities and types, and knows that a haptic device is generating haptic feedback of a particular type, the haptic feedback power recovery code 108 may infer a distance between the power recovery device and the haptic device that is generating haptic feedback based on the amount of power being generated by the power recovery device. Where there are three or more power recovery devices, the haptic feedback power recovery code 108 may triangulate the location of the haptic device generating haptic feedback based on the power generation of the power recovery devices. In some embodiments of the invention, if the haptic feedback power recovery code 108 identifies the power recovery modules as being outside of a threshold distance from the haptic device generating haptic feedback, then the mode of interaction will be changed.

At 206, the haptic feedback power recovery code 108 predicts how much power can be recovered by the power recovery devices based on the identification and the distance and position. The haptic feedback power recovery code 108 may know the number and types of power recovery devices within the multi-device ecosystem and the amount of power they respectively generate in response to different types and/or intensities of haptic feedback, such as by retrieving the data from a database of device information on the power recovery devices and/or through historical learning with respect to how much power similar power recovery devices generated when exposed to types of feedback similar to that which the haptic devices of the multi-device ecosystem are capable of producing in the past. The haptic feedback power recovery code 108 further knows the distance of the power recovery devices from the haptic devices; the haptic feedback power recovery code 108 may thereby predict how much power can be recovered individually and/or collectively by the power recovery devices from haptic feedback generated by the haptic devices at the currently identified distances between the respective devices. Based on this prediction, the haptic feedback power recovery code 108 may identify whether haptic- or vibration-based interaction can be enabled, or any other mode of interaction will be provided. In some embodiments of the invention, the haptic feedback power recovery code 108 may further infer what types of haptic feedback produce the most power from a given power recovery device or type of power recovery device at what distances and may further predict power yield of different types of haptic feedback at a range of distances from a given power recovery device.

At 208, the haptic feedback power recovery code 108 changes the type and/or direction of the haptic feedback based on the prediction and/or the position. The haptic feedback power recovery code 108 may, based on the position of the relative devices, operate a haptic device to change the direction of the haptic feedback projected from the haptic device such that the haptic feedback is aimed towards one or more of the power recovery modules, and/or by aiming haptic feedback from a given haptic device at the closest power recovery module to that haptic device. The haptic feedback power recovery code 108 may change the direction of the haptic feedback based on the prediction by, for example, for each haptic device, determining based on the type of haptic feedback produced by the haptic device and the respective distances between the haptic device and two or more power recovery devices, which power recovery device would produce the most power if the haptic feedback were to be aimed at it. In some embodiments of the invention, for example where a mobile device is equipped with a plurality of haptic devices that produce two or more different types of haptic feedback, the haptic feedback power recovery code 108 may choose one type of haptic feedback to produce based on predicting which type of haptic feedback would produce the most power in the aggregate based on the position, number, and/or type of power recovery modules in the multi-device ecosystem. In some embodiments of the invention, for example where the distance between a haptic device and any power recovery devices exceeds a threshold distance and/or where the haptic feedback power recovery code 108 predicts that no power recovery device would generate power exceeding a minimum threshold from haptic feedback generated by the haptic device, the haptic feedback power recovery code 108 may operate the mobile device comprising the haptic device to produce non-haptic feedback, such as a blinking light or a displaying a graphical element.

At 210, the haptic feedback power recovery code 108 recommends a user move the devices based on the prediction and the distance and position to improve power recovery. The haptic feedback power recovery code 108 may identify what relative positions of the haptic devices and power recovery devices would yield the greatest power recovery from the prediction, and may instruct the user, for example through a prompt on the user's mobile device comprising textual or graphical instructions, to move the devices into the predicted positions. For example, if the user is carrying a cell phone equipped with a power recovery device and is reading a book on a tablet equipped with a haptic device that vibrates when the user turns the page, the haptic feedback power recovery code 108 may recommend that the user place the cell phone next to the tablet so that the power recovery device of the cell phone may recover energy from the vibrations triggered by the haptic device in the tablet.

Figure 3:
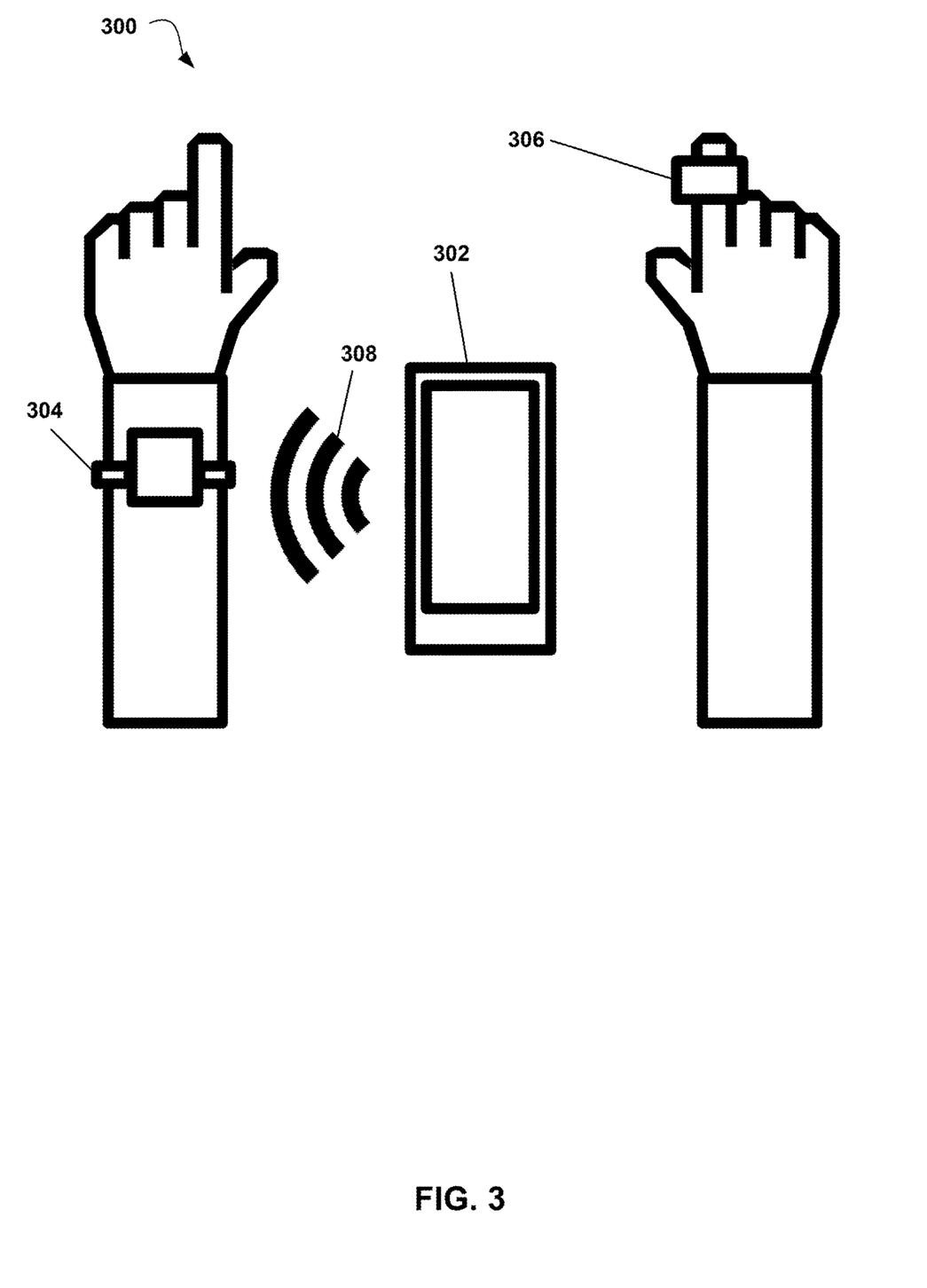
FIG. 3 illustrates an exemplary use case of the haptic feedback power recovery process according to at least one embodiment.

Referring now to FIG. 3, an exemplary use case 300 of haptic feedback power recovery process 200 is depicted according to at least one embodiment. Here, a mobile device 302 equipped with a haptic device that can be oriented in multiple directions is disposed between a smartwatch 304 equipped with a power recovery device and a wearable ring device 306 equipped with a power recovery device. The mobile device 302, smartwatch 304, and ring device 306 may be part of the same multi-device ecosystem associated with a user, where the smartwatch 304 and the ring device 306 are on the person of the user and the mobile device 302 is proximate to the user. Based on predicting the power recovery of the smartwatch 304 and the ring device 306, the haptic feedback power recovery code 108 may predict that the smartwatch 304 will recover more power than ring device 306 if exposed to haptic feedback from the haptic device incorporated into mobile device 302. Accordingly, the haptic feedback power recovery code 108 may operate the mobile device 302 to project haptic feedback 308 towards smartwatch 304. The smartwatch 304 and the ring device 306 may both recover power from the feedback 308.

It may be appreciated that FIGS. 2-3 provide only illustrations of individual implementations and do not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for recovering power from haptic feedback, the method comprising:
   identifying one or more haptic devices and one or more power recovery devices associated with a user;
   dynamically monitoring a position and distance of the one or more haptic devices and the one or more power recovery devices;
   predicting how much power can be recovered by the one or more power recovery devices from haptic feedback generated by the one or more haptic devices based on the position and distance; and
   change a direction of haptic feedback based on the prediction, position, and distance.

2. The method of claim 1, further comprising:
   recommending the user move one or more of the haptic devices or one or more of the power recovery devices based on the prediction, position, and/or distance.

3. The method of claim 1, further comprising:
   changing a type of haptic feedback based on the prediction, position, and/or distance.

4. The method of claim 1, wherein the one or more haptic devices and the one or more power recovery devices associated with the user comprise a multi-device ecosystem.

5. The method of claim 4, further comprising:
   dynamically adding or subtracting one or more of the haptic devices or one or more of the power recovery devices from the multi-device ecosystem responsive to determining that one or more of the haptic devices and one or more of the power recovery devices are on a person of the user.

6. The method of claim 1, wherein the prediction is performed by a machine learning program, and wherein the prediction is based on historical data.

7. The method of claim 1, wherein the one or more power recovery devices comprise piezoelectric materials.

8. A computer system for recovering power from haptic feedback, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   identifying one or more haptic devices and one or more power recovery devices associated with a user;
   dynamically monitoring a position and distance of the one or more haptic devices and the one or more power recovery devices;
   predicting how much power can be recovered by the one or more power recovery devices from haptic feedback generated by the one or more haptic devices based on the position and distance; and
   change a direction of haptic feedback based on the prediction, position, and distance.

9. The computer system of claim 8, further comprising:
   recommending the user move one or more of the haptic devices or one or more of the power recovery devices based on the prediction, position, and/or distance.

10. The computer system of claim 8, further comprising:
    changing a type of haptic feedback based on the prediction, position, and/or distance.

11. The computer system of claim 8, wherein the one or more haptic devices and the one or more power recovery devices associated with the user comprise a multi-device ecosystem.

12. The computer system of claim 11, further comprising:
    dynamically adding or subtracting one or more of the haptic devices or one or more of the power recovery devices from the multi-device ecosystem responsive to determining that one or more of the haptic devices and one or more of the power recovery devices are on a person of the user.

13. The computer system of claim 8, wherein the prediction is performed by a machine learning program, and wherein the prediction is based on historical data.

14. The computer system of claim 8, wherein the one or more power recovery devices comprise piezoelectric materials.

15. A computer program product for recovering power from haptic feedback, the computer program product comprising:
    one or more computer-readable tangible storage medium and program instructions stored on at least one of the one or more tangible storage medium, the program instructions executable by a processor to cause the processor to perform a method comprising:
    identifying one or more haptic devices and one or more power recovery devices associated with a user;
    dynamically monitoring a position and distance of the one or more haptic devices and the one or more power recovery devices;
    predicting how much power can be recovered by the one or more power recovery devices from haptic feedback generated by the one or more haptic devices based on the position and distance; and
    change a direction of haptic feedback based on the prediction, position, and distance.

16. The computer program product of claim 15, further comprising:
    recommending the user move one or more of the haptic devices or one or more of the power recovery devices based on the prediction, position, and/or distance.

17. The computer program product of claim 15, further comprising:
    changing a type of haptic feedback based on the prediction, position, and/or distance.

18. The computer program product of claim 15, wherein the one or more haptic devices and the one or more power recovery devices associated with the user comprise a multi-device ecosystem.

19. The computer program product of claim 18, further comprising:
    dynamically adding or subtracting one or more of the haptic devices or one or more of the power recovery devices from the multi-device ecosystem responsive to determining that one or more of the haptic devices and one or more of the power recovery devices are on a person of the user.

20. The computer program product of claim 15, wherein the prediction is performed by a machine learning program, and wherein the prediction is based on historical data.

* * * * *